United States Patent [19]
Mitchell et al.

[11] Patent Number: 6,018,229
[45] Date of Patent: Jan. 25, 2000

[54] LITHIUM-ION BATTERY PACK WITH INTEGRAL SWITCHING REGULATOR USING CUTOFF TRANSISTOR

[75] Inventors: Nathan Mitchell, The Woodlands; Joseph F. Freiman, Cypress; Thomas Sawyers, Houston, all of Tex.

[73] Assignee: Compaq Computer Corporation, Houston, Tex.

[21] Appl. No.: 08/884,928

[22] Filed: Jun. 30, 1997

[51] Int. Cl.⁷ .................................................. H02J 7/00
[52] U.S. Cl. .......................... 320/112; 320/140; 320/114
[58] Field of Search .................... 320/128, 134, 320/112, 107, 106, 140, 114

[56] References Cited

U.S. PATENT DOCUMENTS

| | | | |
|---|---|---|---|
| 4,563,627 | 1/1986 | Orban | 320/19 |
| 5,629,604 | 5/1997 | Sengupta et al. | |
| 5,684,382 | 11/1997 | Fritz et al. | 320/5 |
| 5,703,463 | 12/1997 | Smith | 320/136 |
| 5,726,554 | 3/1998 | Freiman et al. | 320/21 |
| 5,726,849 | 3/1998 | Nakamura | 361/93 |
| 5,734,254 | 3/1998 | Stephens | |
| 5,764,028 | 6/1998 | Freiman et al. | 320/106 |
| 5,831,350 | 11/1998 | McConkey et al. | 320/106 |

OTHER PUBLICATIONS

U.S. Patent Application of Cho et al., "Battery Module with P–1551. Integrated Converter" SN 08/924,001 filed Aug. 29, 1997.

*Primary Examiner*—Peter S. Wong
*Assistant Examiner*—K. Shin
*Attorney, Agent, or Firm*—Robert Groover

[57] ABSTRACT

A sealed rechargeable lithium-ion battery pack which includes a switching voltage regulator. The regulator uses the normal cutoff transistors as the switching devices, and also includes a discrete inductor in the battery pack. The regulator is operated with programmable voltage and current parameters, under control of a microcontroller which is also inside the sealed battery pack enclosure.

14 Claims, 2 Drawing Sheets

LITHIUM-ION BATTERY PACK WITH INTEGRAL SWITCHING REGULATOR USING CUTOFF TRANSISTOR

BACKGROUND AND SUMMARY OF THE INVENTION

The present invention relates to rechargeable battery packs with integrated electronics for use in portable electronic equipment.

Modern portable computers commonly include an AC adaptor, which permits power to be drawn from a standard mains supply, and connections for one or more rechargeable batteries. When AC power is present, the AC adaptor converts it to DC power, to power the computer and recharge the batteries if needed; when AC power is absent, the computer can run from the batteries (if they are sufficiently charged).

A great variety of battery control circuits and algorithms have been proposed, from vendors such as Dallas Semiconductor, Maxim, benchmarq, and others. Different battery chemistries, cell designs, and charging algorithms are constantly being developed, and therefore continuing improvements are necessary in battery controllers. Such controllers may be designed into a portable computer, or may be designed into a stand-alone battery charger.

BATTERY PACK WITH INTEGRAL SWITCHING REGULATOR

The present application provides a battery pack which includes an integral switching regulator. This regulator can be optimized for the particular cells in the battery pack, and thus any new algorithms, or peculiarities resulting from improved cell design or chemistry, can be accommodated. The system itself does not need to include a battery controller, and indeed the AC-DC conversion circuitry can be made simpler (since the regulator in the battery pack can compensate for imprecision in the AC-DC conversion circuitry).

Preferably an inductor, a capacitor, a microcontroller, and a single pass transistor are integrated in a single package with the battery cells, and a serial bus permits the microcontroller to communicate with the CPU or with a peripheral controller in the system. Alternatively and less preferably, the switching transistor can be controlled from outside the battery pack, or the inductor and/or capacitor can be implemented by a discrete component which is located outside the battery pack.

Preferably the regulator is configured as a buck regulator, but of course a variety of circuit configurations can be used.

Since the battery charging voltage is decoupled from the system power voltage, the requirements for precision in the AC adaptor can be relaxed. For example, a plus or minus 10% tolerance on the DC output voltage from the AC adaptor would normally have been completely unacceptable, but can be tolerated in some cases by using the present invention.

Another advantage is that the voltage applied to the battery can now be varied over the charging cycle, which was previously not practical with an integrated portable system. That is, the switching power supply in the battery pack can be reprogrammed to shift the applied voltage (or voltage clamp level) during the course of the charging cycle. This opens up a tremendous variety of options for optimizing the charging cycle.

Another advantage is that the voltage and current applied to the battery can now be optimized to accommodate temperature dependence.

Another advantage is that the voltage and current applied to the battery can now be optimized to accommodate any dependence on the life history of the particular battery pack.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
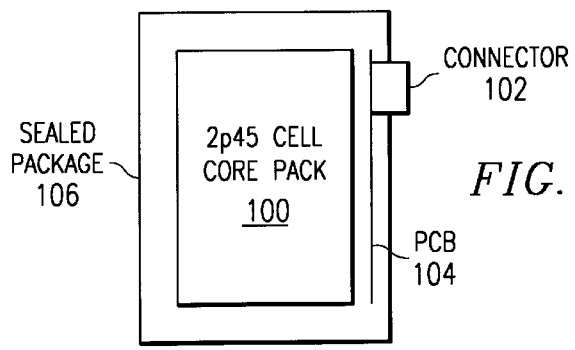
FIG. 1 shows the physical configuration of a sample battery pack with integral regulator.

FIG. 1 shows the physical configuration of a sample battery pack with integral regulator. The core pack 100 of electrochemical cells (a 2p4s pack in this example) is mechanically and electrically connected to a small printed circuit board ("PCB") 104. Both the core 100 and the circuit board 104 are enclosed in a sealed package 106. (The sealed package 106, in this example, is not a totally hermetic seal, but is a sufficiently good seal to provide some protection against moisture and dirt.) A connector 102 extends from the board 104 out through the package 106, and provides 6 terminals (in this example) for connection to a mating connector in the computer system.

Figure 2:
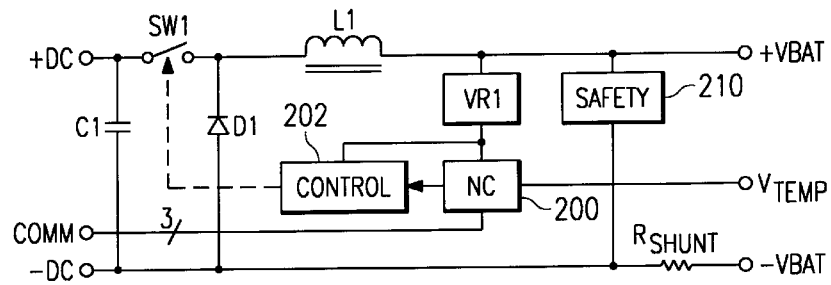
FIG. 2 shows a block diagram of a sample implementation of the circuitry integrated with the battery pack of FIG. 1.

FIG. 2 shows a block diagram of a sample implementation of the board 104 in the battery pack of FIG. 1. In this example the board 104 includes a simple buck regulator, but other configurations can also be used. The input voltages +DC and −DC are supplied from an AC-DC converter which is elsewhere in the system. A capacitor C1 provides some input filtering. A switch SW1 chops current to discrete inductor L1, and free-wheeling diode D1 supplies current to the inductor L1 when the switch SW1 is off. Control circuitry 202 controls the switch SW1, under control of a microcontroller 200. (A sample implementation of control circuitry 200 is shown in detail in FIG. 3.) With the current modulation provided by SW1, L1 provides the desired output voltage at terminal +VBAT. A voltage regulator VR1 provides a steady supply voltage (e.g. 5V) to microcontroller 200 and control circuitry 202. $R_{shunt}$ is a low-value resistor (e.g. 50 mΩ) which is connected to provide a current sensing input (not shown) to microcontroller 200 and control circuitry 202. The microcontroller 200 also has other sensing inputs, which may include, for example, separate voltage inputs for each cell in the battery pack. The microcontroller 200 also receives a temperature-sensing voltage on terminal $V_{temp}$ from a thermistor which is mounted on the battery cells. A multiplexer can optionally be used to route the various sensor inputs to the microcontroller.

Figure 3:
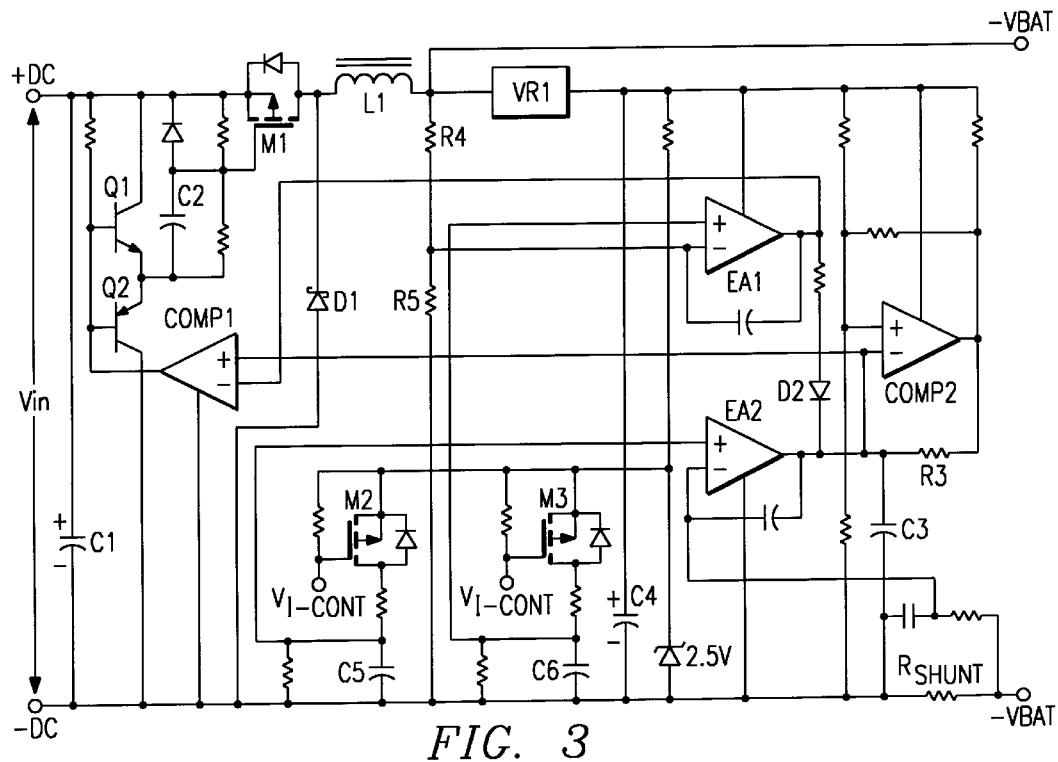
FIG. 3 shows a circuit diagram of a sample implementation of the regulator.

FIG. 3 shows a circuit diagram of a sample implementation of the regulator. All of the circuit elements shown, in this example, are mounted on a small circuit board which is packaged together (e.g. inside a polymer shrink-wrap enclosure) with the pack of battery cells. (As is conventional, the cells will be connected in a series and/or parallel configuration which gives the desired output voltage and maximum output current.)

Voltage Vin (across terminals +DC and −DC) is applied to an input shunt capacitor C1. (This voltage is generated by the AC adaptor shown in FIG. 4.) The positive voltage +DC is connected, through a series inductor L1 and a switching transistor M1, to the positive battery terminal +VBAT. (In this example the switch SW1 of FIG. 2 is implemented by a single P-channel VDMOS switching FET M1, but alternatively other device configurations can be used.) The negative voltage −DC is connected, through a very low-resistance sense resistor $R_{shunt}$, to the negative battery terminal −VBAT. ($R_{shunt}$, in this example, is 50 milliohms.) Diode D1 sources current to the inductor L1 when transistor M1 cuts off.

The other elements shown provide control for transistor M1. The complementary bipolar pair Q1/Q2 provides a push-pull gate drive for power transistor M1, with some boost due to capacitor C2.

The NPN/PNP pair Q1/Q2 is driven by comparator COMP1, which receives one input from the oscillator configured by comparator COMP2, resistor R3, and capacitor C3. (In this example, the resistor R3 and capacitor C3 are preferably sized to achieve an oscillation frequency of about 100 KHz, but of course this can be varied.)

The other input to comparator COMP1 comes from the error amplifiers. Error amplifier EA1 provides voltage feedback, and error amplifier EA2 provides current feedback. Note that the outputs of the two error amplifiers are separated by a diode D2; this allows the voltage feedback signal (from EA1) to dominate under low-current conditions.

Note that a small linear regulator VR1, with an output capacitor C4, is used to provide regulated power to the various elements of the control circuitry. Decoupling the supply to the control components from the power supply being regulated helps to ensure stability, and also permits use of low-voltage components.

The reference voltages to the error amplifiers are both programmable. The reference voltage to EA2 is provided from an integrating capacitor C5 which is pumped by a switching transistor M2. Transistor M2 is driven by a signal $V_{I\text{-}control}$, which is driven directly by the microcontroller. Thus, a shift in the duty cycle of $V_{I\text{-}control}$ will produce a shift in the reference voltage to EA2, and hence will shift the setpoint reference of the current control loop. Similarly, the reference voltage to EA1 is provided from an integrating capacitor C6 which is pumped by a switching transistor M3. Transistor M3 is driven by a signal $V_{I\text{-}control}$, which is driven directly by the microcontroller. Thus, a shift in the duty cycle of $V_{V\text{-}control}$ will produce a shift in the setpoint reference voltage to EA1, and hence will shift the setpoint of the voltage control loop. Thus this circuitry implements a simple programmable control, in which the voltage target and current limit are controlled by the microcontroller.

The feedback to the voltage error amplifier EA1 is provided through a voltage divider R4/R5 from the output voltage, and the feedback to the current error amplifier EA2 is provided from a low-value current-sensing resistor $R_{shunt}$.

In this example comparators Comp1 and Comp2 are LM393s, error amplifiers EA1 and EA2 are LM358s, transistor M1 is an SI4435, C1 is a 25V 68 μF tantalum capacitor, capacitor C2 is a 6.3V 10 μF tantalum capacitor, inductor L1 is a 33 μH discrete inductor; but of course other components and values can be used, with adjustments which will be obvious to those of ordinary skill.

Figure 5:
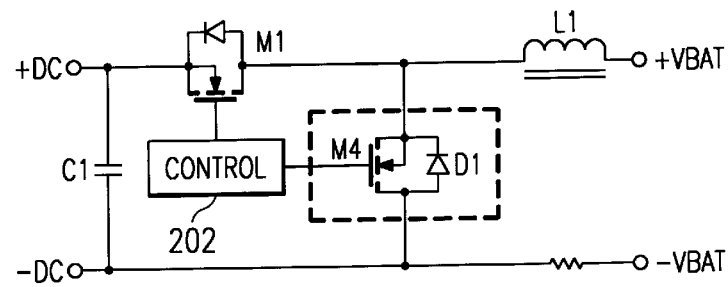
FIG. 5 shows an alternative configuration of the switching regulator components shown in FIG. 3.

FIG. 5 shows an alternative configuration of the switching regulator components shown in FIG. 3. In this embodiment diode D1 is part of another VDMOS switching transistor M4. Transistor M4 is kept off during the charge cycle. However, when current is being drawn from the battery cells, transistor M4 can be switched to provide a voltage boost onto output +VDC. Transistor M1 is kept off, so its body diode provides the isolation diode for the boost circuit. If boost is not required during discharge, then transistor M1 is simply kept on (to reduce voltage drop), and transistor M4 is kept off.

Of course, the sizes of transistors M1 and M4 would need to be appropriately selected for the maximum current to be drawn from the battery pack while voltage-boosting was occurring.

This further capability can be particularly advantageous with battery technologies, such as lithium-ion or Li/MoS$_2$, in which the cell voltage changes significantly during the discharge cycle. In such technologies either or both of the following two advantages can be obtained:

the built-in voltage-boosting capability can be used to extract a greater percentage of the battery's capacity as useful energy; and/or other circuitry which provides a regulated supply voltage to the electronic components can be simplified, since the output voltage from the battery pack can be specified more tightly.

Figure 4:
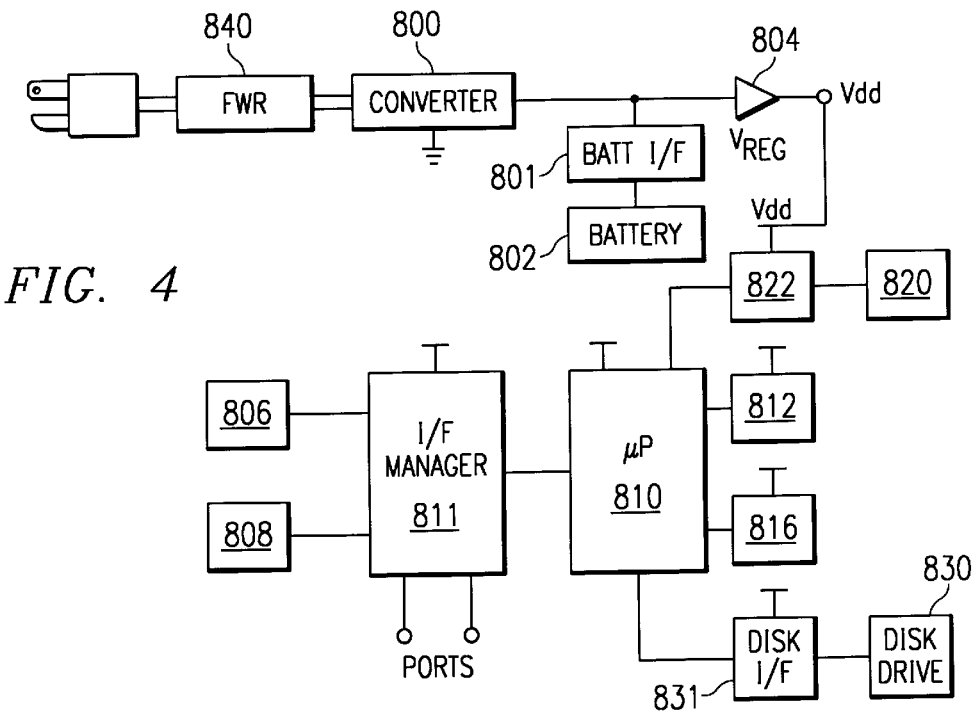
FIG. 4 shows a block diagram of a portable computer system which uses the innovative battery pack with integral regulator.

FIG. 4 shows a portable computer system which includes a power converter 800 which is used to charge the battery 802, which contains the integral regulator. Optionally, a battery interface 801 is interposed between the battery and the rest of the circuitry. The power converter is connected, through a full-wave bridge rectifier 840, to draw power from AC mains, and is connected to provide a DC voltage to the battery. The battery 802 (or the converter 800), connected through a voltage regulator 804, is able to power the complete portable computer system, which includes, in this example: user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

Figure 6:
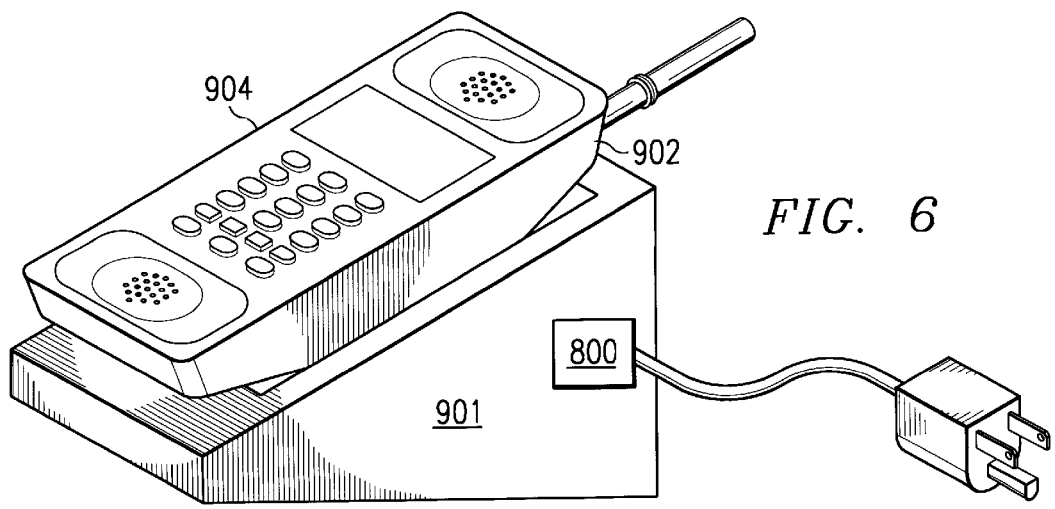
FIG. 6 shows a stand-alone battery charger used to charge the detachable battery module of a mobile telephone, which can be constructed with the integral regulator described above.

FIG. 6 shows a stand-alone battery charger 901, including a power converter 800, which is used to charge the detachable battery module 902 of a mobile telephone 904 which is placed in the rack of the charger 901. In this system embodiment, the battery module 902 can be constructed according to the embodiments described above. In alternative embodiments, the innovative power architecture can be integrated with other portable electronics.

According to another disclosed class of innovative embodiments, there is provided: A battery pack subsystem, comprising: one or more battery cells in a lithium-based technology, jointly connected to first and second internal connections; a pair of external terminals which provide power input to said battery cells during charging, and power output from said battery cells during discharging; a switching device, interposed in series between a first one of said external terminals and an inductor; said inductor being interposed in series between said switching device and said first internal connection of said battery cells; and control circuitry for operating said switching device to perform voltage regulation of power applied to said battery cells; said control circuitry, said switching device, said inductor, and battery cells all being packaged together as a single integral unit.

According to a disclosed class of innovative embodiments, there is provided: A battery pack subsystem, comprising: one or more battery cells in a lithium-based technology, jointly connected to first and second internal connections; a pair of external terminals which provide power input to said battery cells during charging, and power output from said battery cells during discharging; a switching device, interposed in series between a first one of said external terminals and a first internal node; a fuse and an inductor connected in series, and jointly interposed between said first internal node and said first internal connection of said battery cells; a diode, operatively connected between said first internal node and said second internal connection of said battery cells; said second internal connection of said battery cells also being operatively connected to a second one of said external terminals; control circuitry for operating said switching device to perform voltage regulation of power applied to said battery cells; said control circuitry, said switching device, said inductor, and battery cells all being packaged together as a single integral unit.

According to another disclosed class of innovative embodiments, there is provided: A portable electronic system, comprising: electronic operating circuits which perform one or more functions; an AC adaptor which has a connection to receive an AC power input from an external source, and which generates DC power from said AC power input; and a battery pack comprising one or more battery cells in a lithium-based technology, jointly connected to first and second internal connections, a pair of external terminals which provide power input to said battery cells during charging, and power output from said battery cells during discharging, a switching device, interposed in series between a first one of said external terminals and a first internal node; a fuse and an inductor connected in series, and jointly interposed between said first internal node and said first internal connection of said battery cells, a diode, operatively connected between said first internal node and said second internal connection of said battery cells, said second internal connection of said battery cells also being operatively connected to a second one of said external terminals, control circuitry for operating said switching device to perform voltage regulation of power applied to said battery cells; said operating circuits being connected to draw power from said AC adaptor and from said battery pack.

According to another disclosed class of innovative embodiments, there is provided: A computer system, comprising: a user input device; a microprocessor operatively connected to detect inputs from said input device; memory which is connected to be read/write accessible by said microprocessor; a video controller connected to said microprocessor; a display operatively connected to display data generated by said video controller at a first refresh rate; a power supply connected to provide power to said microprocessor, said memory, and said display; an AC adaptor which has a connection to receive an AC power input from an external source, and which generates DC power from said AC power input; and a battery pack comprising one or more battery cells in a lithium-based technology, jointly connected to first and second internal connections, a pair of external terminals which provide power input to said battery cells during charging, and power output from said battery cells during discharging, a switching device, interposed in series between a first one of said external terminals and a first internal node; a fuse and an inductor connected in series, and jointly interposed between said first internal node and said first internal connection of said battery cells, a diode, operatively connected between said first internal node and said second internal connection of said battery cells, said second internal connection of said battery cells also being operatively connected to a second one of said external terminals, control circuitry for operating said switching device to perform voltage regulation of power applied to said battery cells; said microprocessor being operatively connected to draw power from said AC adaptor and from said battery pack.

According to another disclosed class of innovative embodiments, there is provided: A method for charging a portable battery pack in a portable electronic system, comprising the steps of: (a) in an AC adapter subsystem, generating a DC power supply voltage from an AC power input; (b) applying said DC power supply voltage directly to a sealed battery pack, without any intervening voltage regulation; wherein said sealed battery pack includes a switching voltage regulator circuit and one or more battery cells; and (c) operating said switching voltage regulator circuit to apply a controlled voltage to said battery cells.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, other circuit elements can be added to, or substituted into, the specific circuit topologies shown.

For another example, many other circuit configurations can be used to implement a programmable regulator.

For another example, within the constraints well-known to those of ordinary skill, power MOS transistors can be replaced by IGBT and/or MCT devices, with appropriate allowance for reduced turn-off times. In some applications power bipolar devices can also be used.

For another example, within the constraints well-known to those of ordinary skill, nonlinear devices can be added in series with (or used to replace) resistors, to optimize the impedance of load devices.

What is claimed is:

1. A battery pack subsystem, comprising:
   one or more battery cells in a lithium-based technology, jointly connected to first and second internal connections;
   a pair of external terminals which provide power input to said battery cells during charging, and power output from said battery cells during discharging;
   a switching device, interposed in series between a first one of said external terminals and an inductor;
   said inductor being interposed in series between said switching device and said first internal connection of said battery cells; and
   control circuitry for operating said switching device to perform voltage regulation of power applied to said battery cells;
   said control circuitry, said switching device, said inductor, and battery cells all being packaged together as a single integral unit.

2. The battery pack subsystem of claim 1, wherein said switching device consists of one or more semiconductor devices which are not heat-sinked.

3. The battery pack subsystem of claim 1, wherein said lithium-based technology is lithium-ion technology.

4. A battery pack subsystem, comprising:
   one or more battery cells in a lithium-based technology, jointly connected to first and second internal connections;
   a pair of external terminals which provide power input to said battery cells during charging, and power output from said battery cells during discharging;
   a switching device, interposed in series between a first one of said external terminals and a first internal node;
   a fuse and an inductor connected in series, and jointly interposed between said first internal node and said first internal connection of said battery cells;
   a diode, operatively connected between said first internal node and said second internal connection of said battery cells;
   said second internal connection of said battery cells also being operatively connected to a second one of said external terminals;
   control circuitry for operating said switching device to perform voltage regulation of power applied to said battery cells;
   said control circuitry, said switching device, said inductor, and battery cells all being packaged together as a single integral unit.

5. The battery pack subsystem of claim 4, wherein said switching device consists of one or more semiconductor devices which are not heat-sinked.

6. The battery pack subsystem of claim 4, wherein said lithium-based technology is lithium-ion technology.

7. A portable electronic system, comprising:
   electronic operating circuits which perform one or more functions;
   an AC adaptor which has a connection to receive an AC power input from an external source, and which generates DC power from said AC power input; and
   a battery pack comprising one or more battery cells in a lithium-based technology, jointly connected to first and second internal connections,
   a pair of external terminals which provide power input to said battery cells during charging, and power output from said battery cells during discharging,
   a switching device, interposed in series between a first one of said external terminals and a first internal node;
   a fuse and an inductor connected in series, and jointly interposed between said first internal node and said first internal connection of said battery cells,
   a diode, operatively connected between said first internal node and said second internal connection of said battery cells,
   said second internal connection of said battery cells also being operatively connected to a second one of said external terminals,
   control circuitry for operating said switching device to perform voltage regulation of power applied to said battery cells;
   said operating circuits being connected to draw power from said AC adaptor and from said battery pack.

8. The portable electronic system of claim 7, wherein said electronic operating circuits comprise a microprocessor and a memory.

9. The portable electronic system of claim 7, wherein said lithium-based technology is lithium-ion technology.

10. A computer system, comprising:
    a user input device;
    a microprocessor operatively connected to detect inputs from said input device;
    memory which is connected to be read/write accessible by said microprocessor;
    a video controller connected to said microprocessor;
    a display operatively connected to display data generated by said video controller at a first refresh rate;
    a power supply connected to provide power to said microprocessor, said memory, and said display;
    an AC adaptor which has a connection to receive an AC power input from an external source, and which generates DC power from said AC power input; and
    a battery pack comprising
      one or more battery cells in a lithium-based technology, jointly connected to first and second internal connections,
      a pair of external terminals which provide power input to said battery cells during charging, and power output from said battery cells during discharging,
      a switching device, interposed in series between a first one of said external terminals and a first internal node;
      a fuse and an inductor connected in series, and jointly interposed between said first internal node and said first internal connection of said battery cells,
      a diode, operatively connected between said first internal node and said second internal connection of said battery cells,
      said second internal connection of said battery cells also being operatively connected to a second one of said external terminals,
      control circuitry for operating said switching device to perform voltage regulation of power applied to said battery cells;
    said microprocessor being operatively connected to draw power from said AC adaptor and from said battery pack.

11. The computer system of claim 10, wherein said user input device comprises a keyboard.

12. A method for charging a portable battery pack in a portable electronic system, comprising the steps of:
    (a.) in an AC adapter subsystem, generating a DC power supply voltage from an AC power input;

(b.) applying said DC power supply voltage directly to a sealed battery pack, without any intervening voltage regulation; wherein said sealed battery pack includes a switching voltage regulator circuit and one or more battery cells; and (c.) operating said switching voltage regulator circuit to apply a controlled voltage to said battery cells.

13. The method of claim 12, wherein said voltage regulator circuit comprises an inductor, a capacitor, a microcontroller, and a single pass transistor.

14. The method of claim 12, wherein said voltage regulator circuit is configured as a buck regulator.

* * * * *